US012777313B2

(12) United States Patent
Lu et al.

(10) Patent No.: US 12,777,313 B2
(45) Date of Patent: Oct. 27, 2026

(54) SYSTEM FOR AUDIBLE NOTIFICATION OF IMS SERVICE VIA A NON-TERRESTRIAL NETWORK

(71) Applicant: T-MOBILE INNOVATIONS LLC, Overland Park, KS (US)

(72) Inventors: Kun Lu, Bellevue, WA (US); Hang Hoi Yau, Sammamish, WA (US); Jun Liu, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 175 days.

(21) Appl. No.: 18/825,627

(22) Filed: Sep. 5, 2024

(65) Prior Publication Data

US 2026/0067645 A1 Mar. 5, 2026

(51) Int. Cl.
*H04W 4/16* (2009.01)
*G08B 3/00* (2006.01)

(52) U.S. Cl.
CPC ................ *H04W 4/16* (2013.01); *G08B 3/00* (2013.01)

(58) Field of Classification Search
CPC ................................... H04W 4/16; G08B 3/00
See application file for complete search history.

(56) References Cited

U.S. PATENT DOCUMENTS 12,063,097 B2 * 8/2024 Liu .................... H04B 7/18513
2006/0205402 A1 9/2006 Banavar et al.
2010/0113067 A1 5/2010 Fullam et al.
2019/0057584 A1 * 2/2019 Brayton ................... G08B 1/08
2020/0028692 A1 1/2020 Wu
2022/0338159 A1 * 10/2022 Phuyal ................. H04B 17/336
2023/0254799 A1 * 8/2023 Zhu ........................ H04B 7/185 370/503
2023/0353975 A1 * 11/2023 Thompson ............ H04W 4/023
2024/0171990 A1 * 5/2024 Gummadi ........... G06F 3/04817
2024/0389064 A1 * 11/2024 Ozozlu ................... G01S 19/05
2025/0167879 A1 * 5/2025 Zhang ................ H04B 7/18513
2025/0267028 A1 * 8/2025 Kim .................... H04L 12/1845
2025/0293763 A1 * 9/2025 Vivanco .............. H04W 68/005
2025/0301335 A1 * 9/2025 Lei ......................... H04W 24/02
2025/0337481 A1 * 10/2025 Dreiling ................ H04W 60/00
2025/0337831 A1 * 10/2025 Dreiling ............ H04M 1/72421
2025/0358003 A1 * 11/2025 Klatt .................. H04B 7/18545
2026/0032569 A1 * 1/2026 Cui ........................ H04W 48/18
2026/0046016 A1 * 2/2026 Shrestha .............. H04B 7/1851
2026/0059438 A1 * 2/2026 Lee ........................ H04W 48/20
2026/0143446 A1 * 5/2026 Zhang ................... H04W 60/04

FOREIGN PATENT DOCUMENTS

WO 2023/069508 A1 4/2023
WO 2023/131261 A1 7/2023

* cited by examiner

*Primary Examiner* — Jinsong Hu

(57) ABSTRACT

Systems, methods, and software are disclosed herein for providing an audible notification of the status of IMS service of a non-terrestrial cell in various implementations. In one example, a method of operating a computing device includes receiving a service information block from a non-terrestrial cell hosting a current session of network data service to the computing device; processing a service time parameter of the service information block to determine a notification time for a voice call; and enabling an audible notification on the computing device at the notification time.

20 Claims, 7 Drawing Sheets

SYSTEM FOR AUDIBLE NOTIFICATION OF IMS SERVICE VIA A NON-TERRESTRIAL NETWORK

TECHNICAL FIELD

Aspects of the disclosure are related to the field of wireless communication networks, particularly user equipment access to non-terrestrial network cells of wireless communication networks.

BACKGROUND

Due to their extensive service coverage capabilities, non-terrestrial networks (NTNs) are anticipated to facilitate the deployment of wireless services in areas that cannot be served by terrestrial wireless networks such as 4G/LTE or 5G-NR. The deployment of multiple constellations of small satellites in low Earth orbit is expected to address the digital divide and provide internet and voice services to remote and underserved regions. This initiative is likely to enhance global communication infrastructure, enabling connectivity in areas with challenging topography and limited technological resources. Furthermore, NTNs are projected to support emergency response operations by providing reliable communication channels in disaster-stricken or isolated locations.

However, a substantial number of satellites are required to achieve coverage in remote or underserved locations. In the early stages of NTN deployment, the number of satellites in orbit may be insufficient to provide consistent and reliable direct-to-cell communications, resulting in interrupted services for user equipment (UE) due to discontinuous satellite coverage and posing challenges for users in such locations. Additionally, the intermittent coverage might impact various applications that depend on continuous connectivity, such as real-time data transmission and critical communication services.

Overview

Technology is disclosed herein for providing an audible notification of the status of IMS service of a non-terrestrial cell in various examples. In one example, a computing apparatus comprises one or more computer readable storage media, one or more processors operatively coupled with the one or more computer readable storage media and program instructions stored on the one or more computer readable storage media that, when executed by the one or more processors, direct the computing apparatus to receive a service information block from a non-terrestrial cell hosting a current session of network data service to the computing apparatus; process a service time parameter of the service information block to determine a notification time for a voice call; and enable an audible notification on the computing apparatus at the notification time.

In another example, a method of operating a computing device comprises receiving a service information block from a non-terrestrial cell hosting a current session of network data service to the computing apparatus; processing a service time parameter of the service information block to determine a notification time for a voice call; and enabling an audible notification on the computing apparatus at the notification time.

In yet another example of the technology disclosed herein, one or more computer readable storage media having program instructions stored thereon that, when executed by one or more processors, direct a computing apparatus to receive a service information block from a non-terrestrial cell hosting a current session of network data service to the computing apparatus; process a service time parameter of the service information block to determine a notification time for a voice call; and enable an audible notification on the computing apparatus at the notification time.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
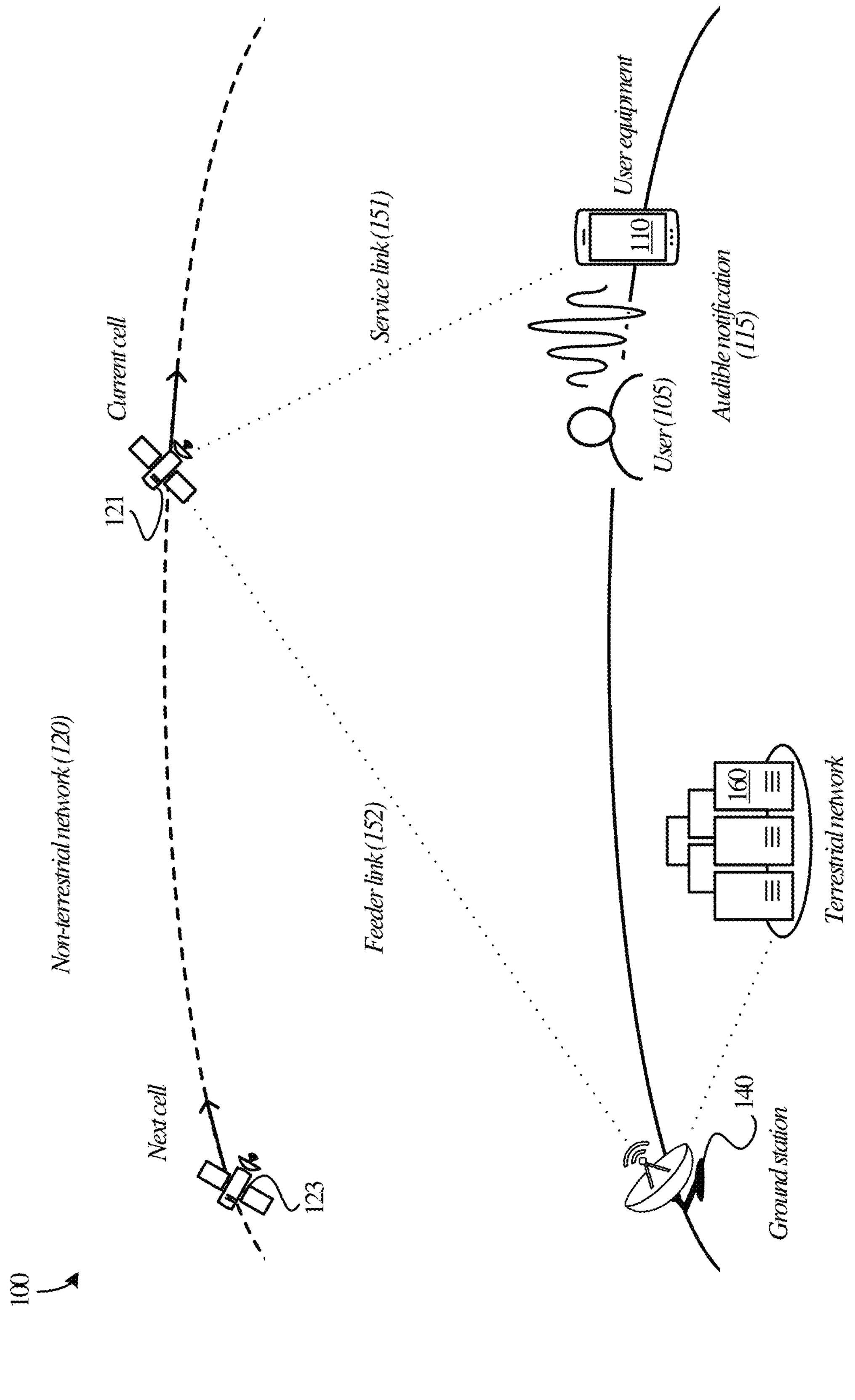
FIG. 1 illustrates an operational environment for providing audible notification of a time remaining for IMS service from a non-terrestrial cell in an implementation.

In areas lacking ground-based infrastructure for network communication, such as remote or hard-to-reach locations, users in those areas may access a non-terrestrial network (NTN) for network IMS (Internet Protocol or IP Multimedia Subsystem) and data services. When a user equipment (UE) (e.g., a smartphone) in a remote location receives IMS service via an NTN of a wireless communication network, the satellites of the network will move in and out of the coverage area of the UE causing disruptions in the service to the UE. Because the satellites hosting the serving cells do not necessarily transit the same orbit, the disruptions to service can be irregular and therefore (from the user's perspective) unpredictable. Various implementations are disclosed herein for technology by which to monitor and provide an audible notification to the user of a UE of the status of IMS service hosted by an NTN including when IMS service will end causing the user's active voice call to be disconnected.

In an implementation, as the user is engaged in an active voice call via IMS service hosted by an NTN, an application executing on the UE receives service time data from the current serving cell hosting network data service to the UE. Based on the service time data, the application generates or plays a recording of a synthesized voice which states during the call session the time remaining for IMS service to be available according to when the current serving cell will move out of range. By alerting the user to the time remaining for IMS service, the user can adapt his/her communication prior to disconnect, thus improving the user experience.

In various implementations, a UE establishes a wireless communication link (e.g., a Radio Resource Control (RRC) connection) with an orbiting cell (e.g., gNodeB) hosting 4G LTE, 5G-NR, or 6G service of a wireless communication network. Upon connecting with the wireless network, the UE receives service information including a Master Information Block (MIB) and Service Information Block 1 (SIB-1) per the 3GPP (Third Generation Partnership Project) specification. In various implementations, the UE confirms specific types of data service which are available to the device, such as messaging or SMS (Short Message Service), IMS service for emergency communications, and so on. For example, SIB-1 includes parameters which indicate whether support for emergency calls is available for the UE. The UE can consult various SIB parameters to determine what services (if any) are available to the device.

Upon connecting to the orbiting cell, the UE requests and receives Service Information Block 19 (SIB-19) including parameters relating to service hosted by the orbiting cells. The current orbiting cell may transmit SIB-19 periodically (e.g., every 480 milliseconds) or on request from a UE. Among the data transmitted in SIB-19, the UE receives a stop time parameter (e.g., t-Service) indicating the time when the current session of data service (from the current serving cell) to the coverage area of the UE will cease to be available. In an implementation, based on the data received in SIB-19, the UE configures a notification to be played or voiced by a text-to-speech synthesizer on the UE at a preset interval of time prior to the cessation of IMS service. For example, during a voice call, when the application determines that IMS service will terminate in one minute, the application causes an audible message to be played on the UE for the user to hear during the call, such as, "Network service for this call will terminate in one minute." In some instances, the application may provide one or more audible notifications at various preset intervals prior to cessation of service, such as two minutes before, one minute before, 20 seconds before, etc.

In various implementations, to configure an audible notification, the UE executes an application which receives and processes the service time data (e.g., the t-Service parameter) from the current serving cell and produces a service stop time, i.e., a time when IMS service will cease based on the current serving cell moving out of range of the UE. To process the service time data to determine the service stop time, the service time value is converted to a local time based on the location of the UE. The application then computes a notification time (i.e., a clock time at which an audible notification is to be played) based on subtracting the predetermined notification interval from the service stop time. For example, for a notification interval of one minute, an audible notification will be played during an active voice call at one minute before IMS service ends.

In many cases, the service time data is transmitted by the serving cell as a numerical value or timestamp which indicates a specific date/time in terms of the number of intervals from a specified epoch date/time. For example, the service time data may be specified in terms of multiples of 10 milliseconds since the epoch date of 00:00:00 UTC (Coordinated Universal Time) of 1 Jan. 1900 of the Gregorian calendar. In an implementation, to process the service time parameter received from the serving cell to determine the service stop time and the notification time, the application determines the local time zone of the UE based on the detected location of the UE and converts the service time value to a time of the local time zone. For example, for a UE determined to be in the Mountain Standard Time (MST), the application converts the value of the t-Service parameter to MST providing an estimation of the time at which IMS service will end.

With the service stop time and notification time determined, the application monitors the clock time based on an internal clock of the UE and initiates an audible notification at the notification time so that the audible notification is played when the time remaining for service reaches a predetermined value (e.g., one minute). In various implementations, the UE periodically receives (or requests and receives) SIB-19 data from the current serving cell and recomputes the notification time based on the latest service time data (i.e., the latest t-Service value).

Technical effects of the technology disclosed herein include enabling a UE to receive and monitor service time for network IMS service hosted by an NTN and to generate an audible notification on the UE based on the time remaining for service from a serving cell of the NTN. In this way, the user is notified about the status or availability of voice call service hosted by orbiting cells, which is particularly important for users in remote locations lacking terrestrial network coverage.

Turning now to the Figures, FIG. 1 illustrates operational environment 100 for providing an audible notification of the time remaining for IMS service hosted by a cell of an NTN in an implementation. Operational environment 100 includes UE 110, terrestrial network 160, and NTN 120. NTN 120 includes current cell 121 and next cell 123 in orbit. Current cell 121 is in communication with UE 110 and ground station 140 via service link 151 and feeder link 152, respectively. Ground station 140 communicates with terrestrial network 160.

Figure 7:
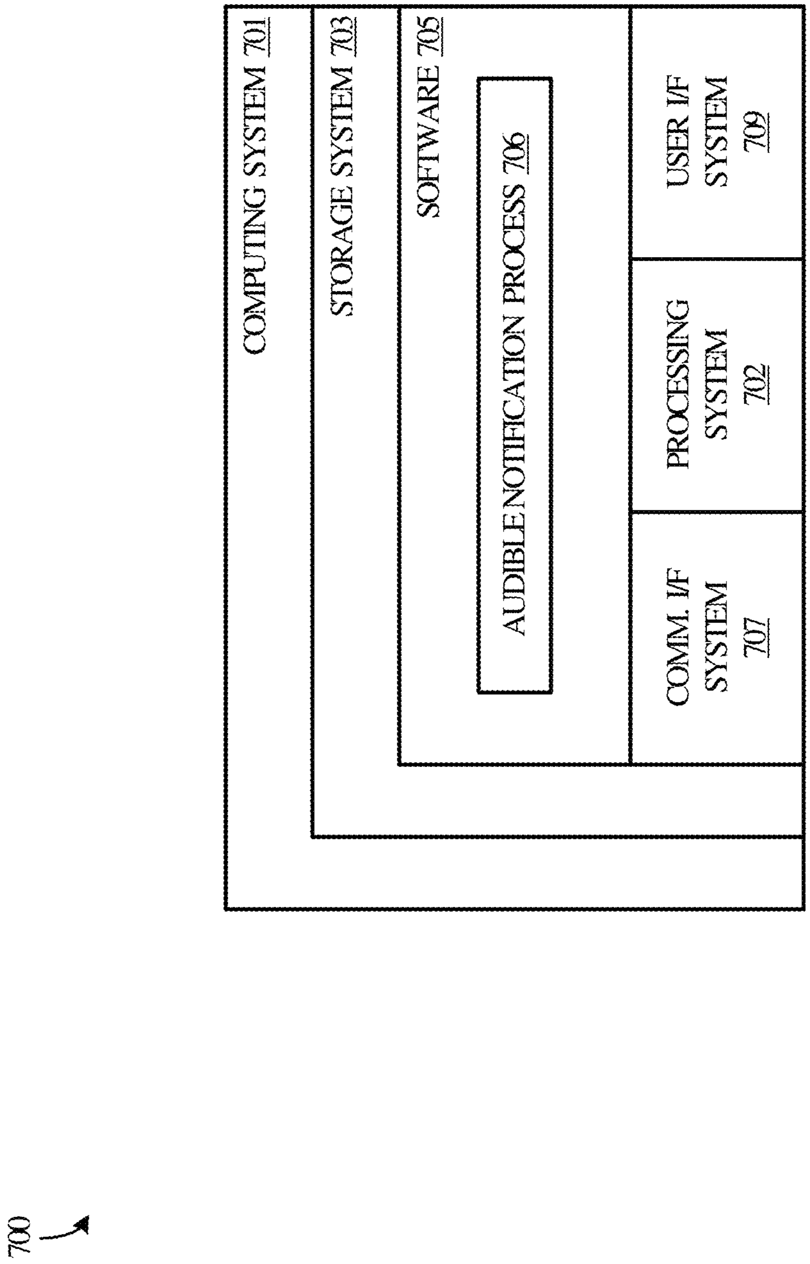
FIG. 7 illustrates a computing system suitable for implementing the various operational environments, architectures, processes, scenarios, and sequences discussed below with respect to the other Figures.

UE 110 is representative of a device, such as a smartphone, computer, sensor, controller, radio, and/or some other user apparatus, with processing circuitry for wireless communication with a cell (e.g., gNodeB) of a wireless network hosted by NTN 120. UE 110 exchanges wireless communication signals with orbiting cells of NTN 120 over radio frequency bands based on protocols such as Fifth Generation New Radio (5GNR), 5G Advanced, LTE, 6G, Institute of Electrical and Electronic Engineers (IEEE) 702.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA). UE 110 can include devices such as Internet of Things (IoT) devices, wearable devices, smart vehicles, robots, sensors, augmented or virtual reality devices, and the like, such as a laptop or desktop computer, or mobile computing device, such as a tablet computer or cellular phone, of which computing system 701 in FIG. 7 is broadly representative.

NTN 120 is representative of a constellation of non-terrestrial (e.g., orbiting) cells which broadcast radio signals comprising wireless communication for terrestrial network 160. NTN 120 can include Earth-orbiting satellites or high-altitude platform systems carrying serving cells. Current cell 121 and next cell 123 of NTN 120 are representative of cells onboard satellites or other aerial platforms which support wireless communication network, including IMS and data service, to devices such as UE 110. Current cell 121 or next cell 123 may include a gNodeB or eNodeB base station of a wireless communication network. An exemplary end-to-end communication path of elements of operational environment 100 relays communications from UE 110 to current cell 121 via service link 151, then to ground station 140 via feeder link 152. From ground station 140, communication is carried to a network core of terrestrial network 160 and on to an endpoint such as another UE, a data network, a cloud-based destination, etc.

Figure 6:
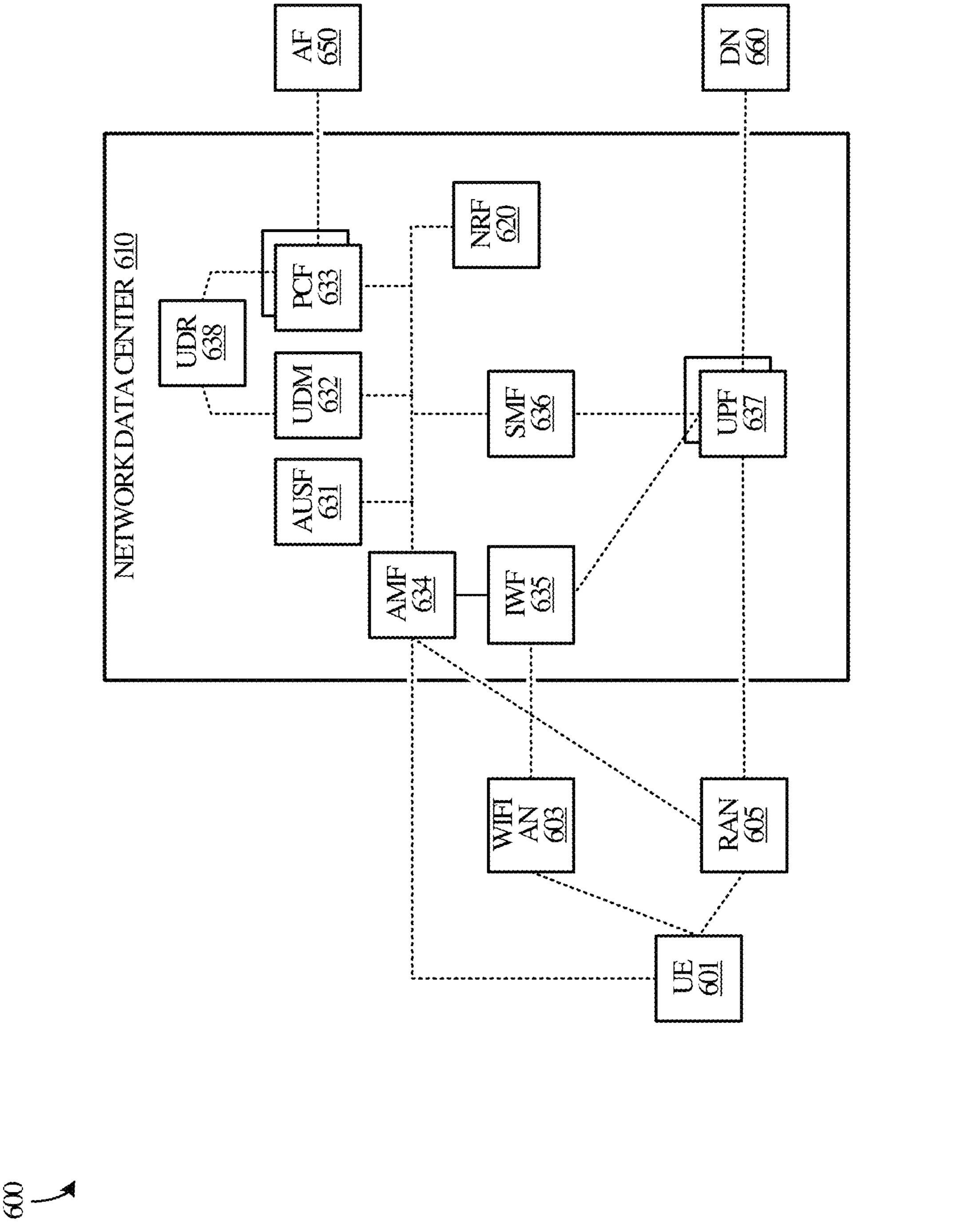
FIG. 6 illustrates an architecture for a network data center of wireless communication network in an implementation.

Terrestrial network 160 is representative of a communication network capable of using a Fifth Generation New Radio (5G-NR), 5G Advanced, 6G, LTE, or other protocol to provide network connectivity for wireless IMS and data service to wireless communication devices such as UE 110. In an implementation, terrestrial network 160 is representative of a service-based architecture (SBA) which includes network functions constituting the control plane and user plane elements of a network core, of which network data center 610 of FIG. 6 is representative. The network functions of terrestrial network 160 are implemented on one or more suitable computing devices, of which computing device 701 of FIG. 7 is representative. Examples of suitable computing devices include server computers, blade servers, and the like. The network elements of terrestrial network 160 may be implemented in the context of one or more data centers in a co-located or distributed manner, or in some other arrangement.

In a brief operational scenario of operational environment 100, UE 110 searches and discovers current cell 121 for network data service. UE 110 attaches to current cell 121 and confirms the availability of network data service, including IMS service, hosted by current cell 121. UE 110 receives an SIB-19 communication from current cell 121 via service link 151 including service time parameter for the current session of data service hosted by current cell 121. Based on the service time parameter, UE 110 computes a localized stop time for network service based on the service time parameter. UE 110 may also continue to receive SIB-19 transmissions including updated service time parameters from which UE 110 recomputes the localized stop time for network service.

Continuing with the brief operational scenario, user 105 places a voice call on UE 110. UE 110 attaches to terrestrial network 160 via current cell 121 by sending a registration request to the network, followed by authentication and network registration. Terrestrial network 160 assigns an IP address to UE 110 and establishes a Protocol Data Unit (PDU) session to connect UE 110 to the packet data network (PDN) for data services including voice calls. The IMS stack of UE 110 handles the Session Initiation Protocol (SIP) signaling while the network sets up a dedicated bearer within the PDU session specifically for voice traffic.

While the voice call is active, UE 110 computes a time for a notification to be made which indicates the time remaining for network service. For example, if a notification is to be provided when the time remaining reaches (or is about to reach) a one-minute threshold, UE 110 computes a notification time at which audible notification 115 is to be played based on subtracting one minute from the localized stop time. At the notification time, with the voice call still active, UE 110 plays audible notification 115 during the call. In various implementations, audible notification 115 is a portion of text which is read aloud in a human-like voice by a text-to-speech synthesizer which states the time remaining until service is no longer available, e.g., "The time remaining for call service is one minute." When the current session of data service expires, UE 110 loses its connection to current cell 121.

Figure 2:
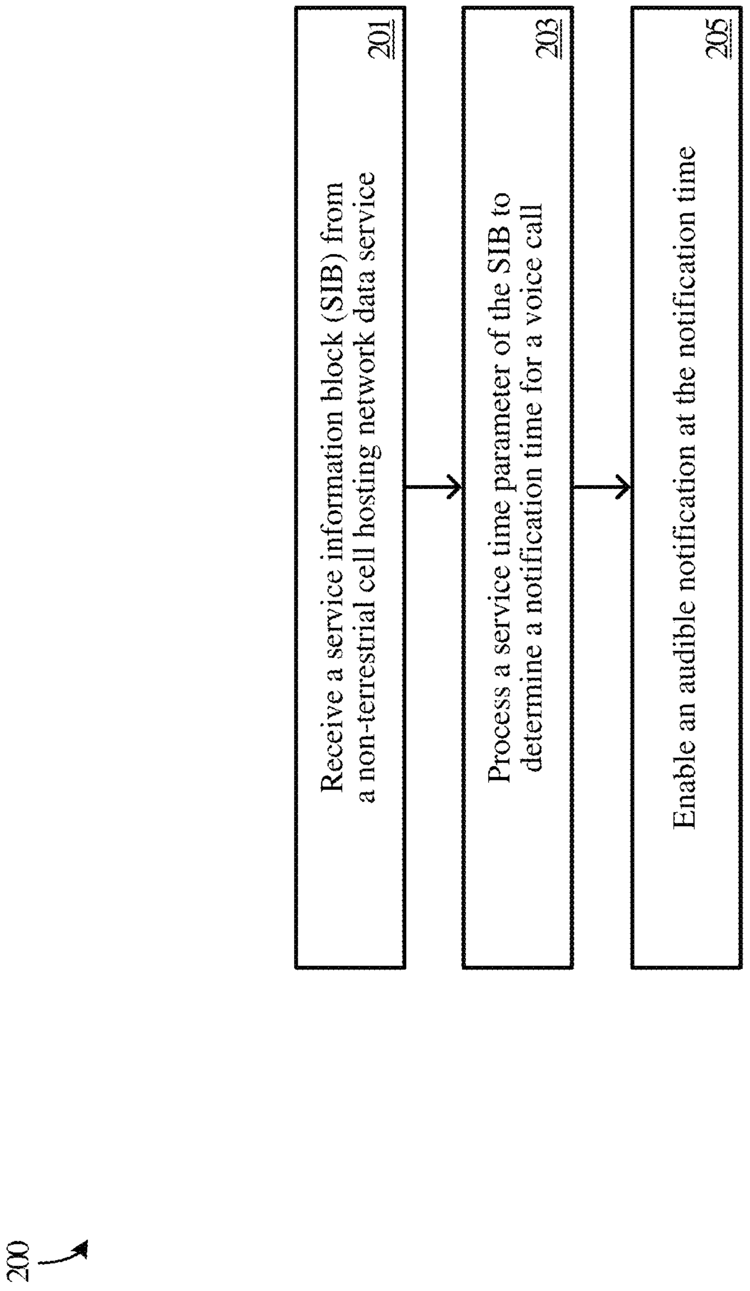
FIG. 2 illustrates a process for providing audible notification of a time remaining for IMS service from a non-terrestrial cell in an implementation.

FIG. 2 illustrates a method for providing an audible notification of the time remaining for network IMS service hosted by a cell of an NTN in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

In process 200, a computing device receives a service information block (SIB) from a non-terrestrial cell hosting a current session of network data service (step 201). In an implementation, the computing device, such as a smartphone or other mobile computing device, establishes a communication link with a terrestrial network, e.g., a wireless network, via an NTN. The computing device receives network data service via a communication link with a non-terrestrial serving cell, such as a gNodeB, onboard an orbiting satellite of the NTN. The computing device receives a service information block, such as an SIB-19 of the 3GPP standard, which includes operational parameters relating to communication between the computing device and the non-terrestrial cell onboard the satellite. In an implementation, upon confirming the availability of network data service, the computing device places or receives a voice call, such as a voice-over-IP (VOIP), voice-over-LTE (VoLTE), or voice-over-5G (Vo5G/VoNR), via the communication link with the non-terrestrial serving cell.

The computing device processes a service time parameter of the SIB to determine a notification time for the active voice call (step 203). In an implementation, the computing device processes a service time parameter of the SIB to determine a service stop time and a notification time, where the notification time is based on a predetermined interval of the time remaining of the current session of network data service hosted by the non-terrestrial cell. The service time parameter includes a time at which data service hosted by the non-terrestrial cell will cease to be available to the computing device. The computing device computes the notification time based on subtracting a notification interval from the stop time based on the service time parameter. For a simple example, if the service time parameter indicates that the service will become unavailable at 13:15:00 EST and the notification interval is 1 minute, the notification time will be 13:14:00 EST; if a voice call is in progress at the notification time, the notification message will be played on the UE.

In an implementation, to determine the notification time, the value of the service time parameter is converted to a stop time in terms of the time zone of the computing device. The computing device may determine the time zone of the computing device based on the detected location of the computing device. The computing device computes the notification time based on the localized stop time and the notification interval. For example, the service time parameter may be a t-Service parameter the value of which indicates the time of cessation of service in terms of a quantity of 10-ms increments of time since 00:00:00 UTC on 1 Jan. 1900 of the Gregorian calendar, such that cessation of service occurs in the interval of time between the value of the parameter less 1 and the value. The computing device converts the t-Service parameter value to a local time based on the detected location of the computing device. The notification time is calculated as a time at some predetermined interval before the localized stop time, such as the clock time one minute before the localized stop time.

The computing device enables an audible notification on the UE at the notification time (step 205). In an implementation, the computing device determines that the voice call is still active, then plays an audio clip of a human voice reading a notification message based on the notification interval. The audio clip may be played through an audio output device of the UE depending on how the user is using the UE for the active voice call. The audio clip may be a recorded message generated by a text-to-speech synthesizer based on a textual message for the applicable notification interval. The notification interval may be a setting on the UE with a default value (e.g., one minute) which the user can select or modify. In some cases, the UE may enable multiple audible notifications during the active voice call based on computing multiple notification times. For example, a one-minute notification message may be played at the appropriate time, followed by a shorter message when there are twenty seconds of service remaining if the call is still in progress.

Referring again to FIG. 1, operational environment 100 illustrates a brief example of process 200 as employed by elements of operational environment 100. In operation, UE 110 is receiving network data service including IMS service from terrestrial network 160 via current cell 121 onboard a satellite of NTN 120. UE 110 receives a service information block (e.g., SIB-19) from current cell 121 including a service time parameter (e.g., a t-Service parameter of SIB-19). During an active voice call, UE 110 processes the service time parameter to determine the time at which a notification message should be played to the user which indicates the time remaining for the current session of network data service. To determine the time for the notification, UE 110 converts the service time parameter to a localized stop time, then computes the notification time based on subtracting a notification interval from the localized stop time. UE 110 monitors the time and, upon detecting that the notification time has been reached, plays the notification message to the user based on the audio output device (e.g., speaker, wearable device) of UE 110 by which the user listening to the call. In some implementations, UE 110 plays a follow-on notification message at a time closer to the stop time if the call is still active based on a second or follow-on notification interval.

In various implementations, the number and timing of notification messages are predetermined according to settings or selections made for a notification application executing on UE 110. For example, the user may activate the audible notification functionality, select the number of notifications to be provided, and when the notification messages should be provided. For example, default settings may provide that a single notification message is to be played during an active voice call at one minute prior to the cessation of service (according to the service time parameter). The user may elect to have a second message played when there are fifteen seconds remaining if the call is still active. An example of a user experience of a notification application for receiving user selections relating to providing audible notifications in provided in FIG. 5, discussed below.

Figure 3:
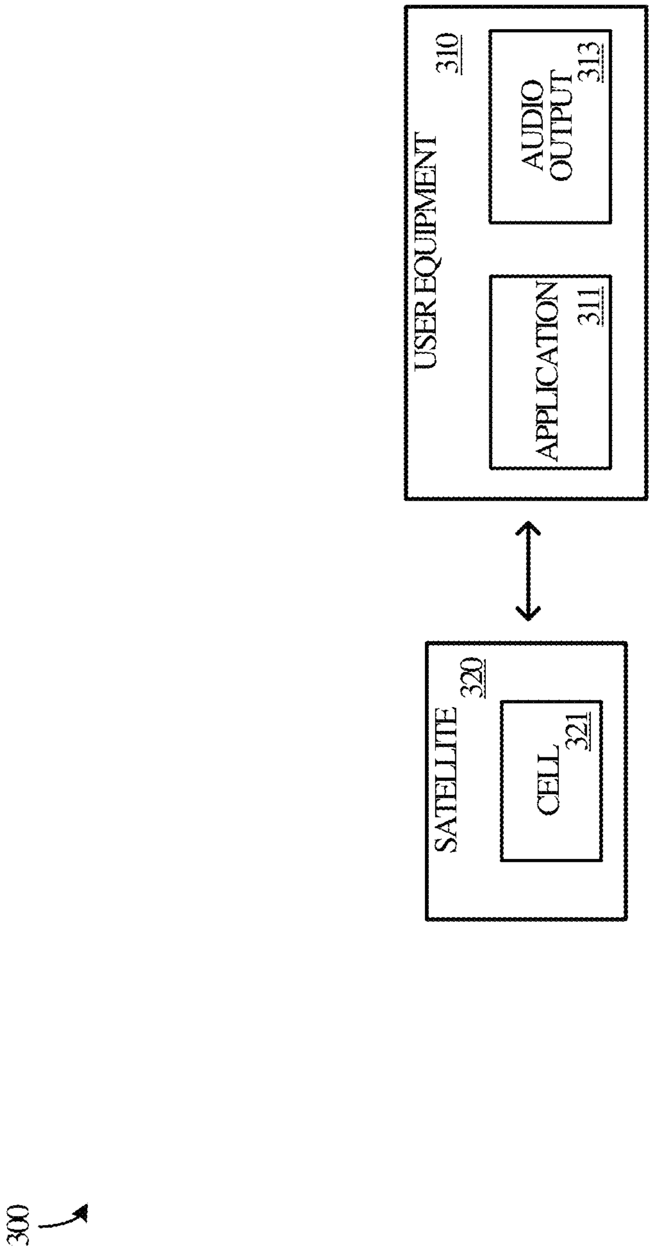
FIG. 3 illustrates an operational architecture for providing audible notification of a time remaining for IMS service from a non-terrestrial cell in an implementation.

FIG. 3 illustrates operational architecture 300 for providing an audible notification of the time remaining for IMS service hosted by a cell of an NTN in an implementation. Operational architecture 300 includes UE 310 in wireless communication with orbiting satellite 320. UE 310 includes application 311 and audio output device 313. Satellite 320 includes cell 321.

UE 310 is representative of a computing device, such as a smartphone, computer, sensor, controller, radio, and/or some other user apparatus, with processing circuitry for wireless communication with a cell (e.g., gNodeB) of a wireless network. For example, UE 310 exchanges wireless communication signals with orbiting cells of a non-terrestrial network over radio frequency bands based on protocols such as Fifth Generation New Radio (5GNR), 5G Advanced, LTE, 6G, Institute of Electrical and Electronic Engineers (IEEE) 702.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA). UE 310 can include devices such as Internet of Things (IoT) devices, wearable devices, smart vehicles, robots, sensors, augmented or virtual reality devices, and the like, such as a laptop or desktop computer, or mobile computing device, such as a tablet computer or cellular phone, of which computing system 701 in FIG. 7 is broadly representative. Audio output device 313 of UE 310 is representative of a device which delivers sound to the user by which the user can listen to a voice call on UE 310, such as a built-in speaker, a connected device such as wired or wireless headphones or a Bluetooth-connected speaker, or the like.

Satellite 320 is representative of an orbiting platform including functionality for wireless communication with ground-based endpoints. Cell 321 onboard satellite 320 is representative of a network functionality which transmits and receives wireless communication signals, including IMS and data service transmissions, to devices such as UE 310. Cell 321 may include a gNodeB or eNodeB base station of a wireless communication network. In various implementations, cell 321 transmits operational parameters in the form of Master Information Blocks and Service Information Blocks per the 3GPP standard to devices such as UE 310.

Figure 4:
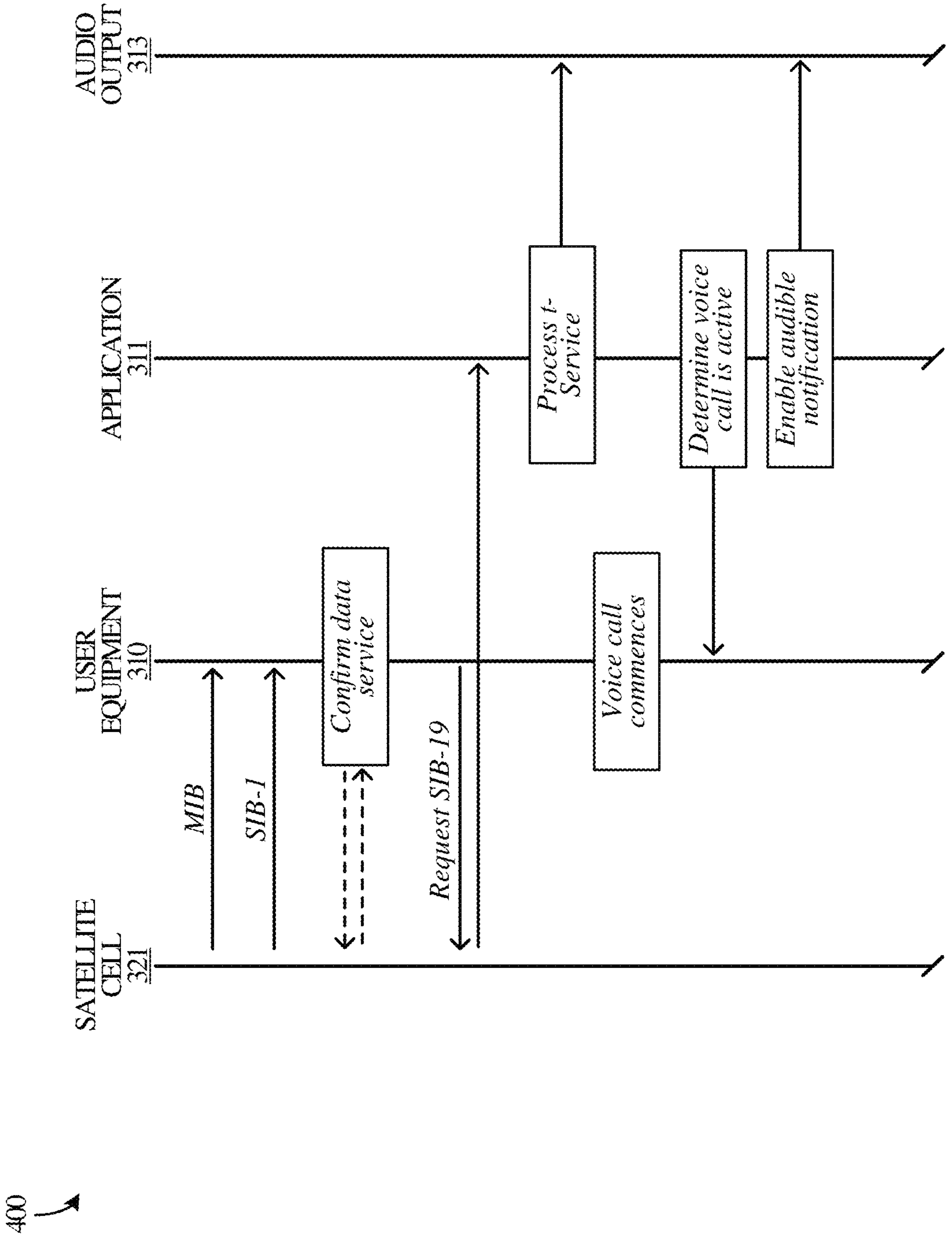
FIG. 4 illustrates a workflow for providing audible notification of a time remaining for IMS service from a non-terrestrial cell in an implementation.

FIG. 4 illustrates workflow 400 for providing an audible notification of the time remaining for IMS service hosted by a cell of an NTN in an implementation, referring to elements of operational architecture 300 of FIG. 3. In workflow 400, UE 310 attaches to a wireless communication network for network data service including IMS service, establishing a communication link to the network via cell 321 of satellite 320. UE 310 receives MIB and SIB-1 from cell 321 including operational parameters for wireless communication. UE 310 confirms that network data service is available based on information received in various information blocks from cell 321. To confirm that network data service is active, UE 310 consults various operational parameters of MIB or SIB-1 or of another (requested and received) SIB, such as SIB-2. Upon confirming that network data service is available for UE 310, UE 310 pings cell 321 to receive SIB-19.

Upon receiving SIB-19, application 311 executing on UE 310 extracts service time parameter t-Service from SIB-19. Application 311 processes the service time parameter to determine the time for cessation of the current session of network data service provided by cell 321. To process the service time parameter, the value of the parameter is converted to a local time per the time zone of UE 310. Application 311 computes a notification time based on the stop time for the current session and a predetermined notification interval. Following the establishment of the communication link with cell 321 of satellite 320, UE 310 may commence a voice call by either initiating an outgoing voice call to another UE or receiving an incoming voice call from another UE via cell 321. At or near the notification time, application 311 determines whether the voice call is still active. Upon determining that the voice call is still active, application 311 causes an audible notification to be played by audio output device 313. To play the audible notification, application 311 may retrieve an audio clip which includes a voice speaking the notification message for the specified notification interval (e.g., one minute prior to cessation) from a library of audio clips. In some cases, application 311 may cause a text-to-speech synthesizer on UE 310 to read a configured text of the notification message. The audible notification may be played such that only the user of UE 310 hears a notification message, and the message is not transmitted to another device engaged in the call. In some cases, application 311 initiates the notification message a short time (e.g., one or two seconds) before the calculated notification time such that the delivery of the message ends at the notification time.

Figure 5:
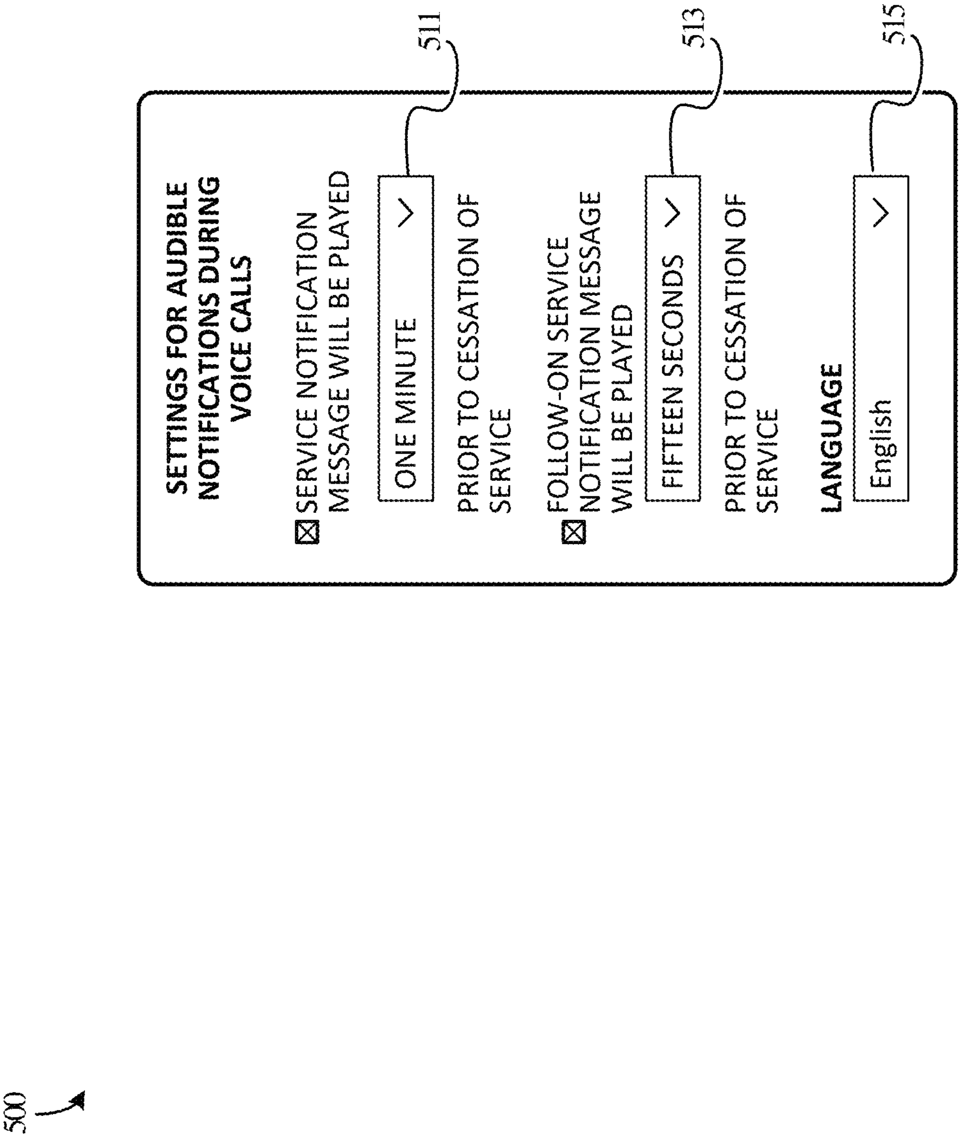
FIG. 5 illustrates a user experience of an application for providing audible notification of a time remaining for IMS service from a non-terrestrial cell in an implementation.

FIG. 5 depicts user experience 500 displayed on a UE such as a smartphone or other computing device for configuring settings for a service which provides audible notifications of the time remaining for IMS service during a voice call on the UE in an implementation. In various implementations, the UE executes an application (e.g., an audible notification application) which enables audible notifications according to settings and selections depicted in user experience 500.

User experience 500 includes options presented as graphical objects (e.g., buttons, checkboxes, dropdown menus) by which the user can select whether to receive one or more audible notifications, when the notifications are to be played in relation to the cessation of service, and/or the language of the audible notification message. In an exemplary operational scenario, a UE receiving IMS service via a non-terrestrial cell of a wireless communication network determines that a voice call is active on the device. The UE determines a stop time for the IMS service and plays a notification message on the UE in accordance with the default or user-selected values of dropdown menu 511. In various implementations, the audible notification is an audio clip of a spoken notification message based on the value of dropdown menu 511. The user may also elect to have a follow-on notification message played in the event that the call is still active at a time closer to the cessation of service. The user may select an interval of time for the follow-on message via dropdown menu 513. User experience 500 also includes dropdown menu 515 by which the user can select the language of the audible notification message, e.g., English, Spanish, French, etc.

Based on the configured settings illustrated in user experience 500, the application may select from a library of prerecorded audio clips of notification messages spoken in the default or selected notification language. In some scenarios, however, the application may generate a message based on the settings which is read by a text-to-speech synthesizer on the UE at the notification time (or shortly before).

FIG. 6 illustrates exemplary wireless communication system 600 that serves wireless UEs such as UE 601. Wireless communication system 600 includes UE 601, Wifi Access Node (AN) 603, 5GNR radio access node (RAN) 605, Interworking Function (IWF) 635, Access and Mobility Management Function (AMF) 634, Authentication Server Function (AUSF) 631, Unified Data Management (UDM) 632, Policy Control Functions (PCFs) 633, Session Management Function (SMF) 636, User Plane Function (UPF) 637, Uniform Data Repository (UDR) 638, and Application Function (AF) 650. UDR 638 stores network data including subscriber profiles including identities, subscription details, service preferences, authentication credentials, and billing information. UDR 638 may also store policy data such as network rules, access rules, mobility rules, charging rules, and so on. AF 650 may provide policies applicable to control plane functions, that is, to the application, presentation, and/or session layers of the OSI protocol stack. IWF 635 includes non-3GPP IWFs (N3IWFs) for providing untrusted non-3GPP access to network data center 610, such as access via a non-cellular access network. DN 660 is representative of a data network, Internet access, third-party resource, or other endpoint of an end-to-end communication path from UE 601.

In an implementation, UE 601 communicates with network data center 610 via 5G-NR RAN 605 onboard a non-terrestrial platform, such as an orbiting satellite. UE 601 requests access to the wireless communication network hosted by wireless communication system 600 via a service link such as a Uu link to NR RAN 605. NR RAN 605 relays communications from UE 601 to ground-based network data center 610 via a feeder link.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements audible notification process 706, which is (are) representative of audible notification processes discussed with respect to the preceding Figures, such as process 200 and workflow 400. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including audible notification process 706) may be implemented in program instructions and among other functions may, when executed by processing system 702, direct processing system 702 to operate as described with respect to the various operational scenarios, sequences, and processes illustrated herein. For example, software 705 may include program instructions for implementing an audible notification process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support audible notification processes in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computing apparatus comprising:

one or more computer readable storage media;

one or more processors operatively coupled with the one or more computer readable storage media; and program instructions stored on the one or more computer readable storage media that, when executed by the one or more processors, direct the computing apparatus to at least:

receive a service information block from a non-terrestrial cell hosting a current session of network data service to the computing apparatus;

process a service time parameter of the service information block to determine a notification time for a voice call; and enable an audible notification on the computing apparatus at the notification time.

2. The computing apparatus of claim 1, wherein the audible notification comprises a playing of an audio clip of a spoken notification message via an audio output device of the computing apparatus.

3. The computing apparatus of claim 2, wherein to enable the audible notification on the computing apparatus at the notification time, the program instructions further direct the computing apparatus to select the audio clip from a library of audio clips based on a notification interval.

4. The computing apparatus of claim 1, wherein to enable the audible notification at the notification time, the program instructions further direct the computing apparatus to confirm that the voice call is active prior to enabling the audible notification.

5. The computing apparatus of claim 1, wherein to process the service time parameter of the service information block to determine the notification time, the program instructions direct the computing apparatus to compute the notification time based on subtracting a notification interval from a value of the service time parameter.

6. The computing apparatus of claim 5, wherein the program instructions further direct the computing apparatus to receive a user input comprising a selection of the notification interval in a user interface of the computing apparatus.

7. The computing apparatus of claim 6, wherein the program instructions further direct the computing apparatus to play a second audible notification on the computing apparatus at a second notification time during the voice call.

8. The computing apparatus of claim 1, wherein the program instructions further direct the computing apparatus to confirm an availability of network data service to the computing apparatus from the non-terrestrial cell.

9. A method of operating a computing device comprising:

receiving a service information block from a non-terrestrial cell hosting a current session of network data service to the computing device;

processing a service time parameter of the service information block to determine a notification time for a voice call; and enabling an audible notification on the computing device at the notification time.

10. The method of claim 9, wherein the audible notification comprises a playing of an audio clip of a spoken notification message via an audio output device of the computing device.

11. The method of claim 10, wherein enabling the audible notification on the computing device at the notification time comprises selecting the audio clip from a library of audio clips based on a notification interval.

12. The method of claim 9, wherein enabling the audible notification at the notification time comprises confirming that the voice call is active prior to enabling the audible notification.

13. The method of claim 9, wherein processing the service time parameter of the service information block to determine the notification time comprises computing the notification time based on subtracting a notification interval from a value of the service time parameter.

14. The method of claim 13, further comprising receiving a user input comprising a selection of the notification interval in a user interface of the computing device.

15. The method of claim 14, further comprising playing a second audible notification on the computing device at a second notification time during the voice call.

16. One or more computer readable storage media having program instructions stored thereon that, when executed by one or more processors, direct a computing apparatus to at least:

receive a service information block from a non-terrestrial cell hosting a current session of network data service to the computing apparatus;

process a service time parameter of the service information block to determine a notification time for a voice call; and enable an audible notification on the computing apparatus at the notification time.

17. The one or more computer readable of claim 16, wherein the audible notification comprises a playing of an audio clip of a spoken notification message via an audio output device of the computing apparatus.

18. The one or more computer readable of claim 17, wherein to enable the audible notification on the computing apparatus at the notification time, the program instructions further direct the computing apparatus to select the audio clip from a library of audio clips based on a notification interval.

19. The one or more computer readable of claim 16, wherein to enable the audible notification at the notification time, the program instructions further direct the computing apparatus to confirm that the voice call is active prior to enabling the audible notification.

20. The one or more computer readable of claim 16, wherein to process the service time parameter of the service information block to determine the notification time, the program instructions direct the computing apparatus to compute the notification time based on subtracting a notification interval from a value of the service time parameter.

* * * * *